Figure 1:
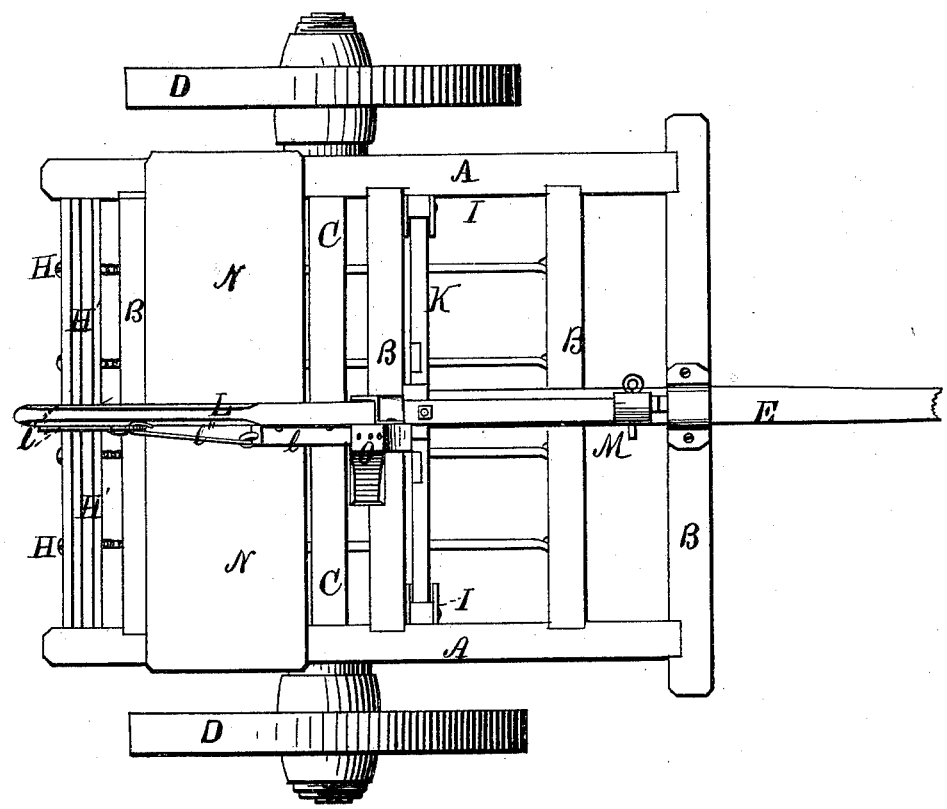

3 Sheets--Sheet 1.

W. A. McCLINTOCK.
Seed-Drill.

No. 165,603. Patented July 13, 1875.

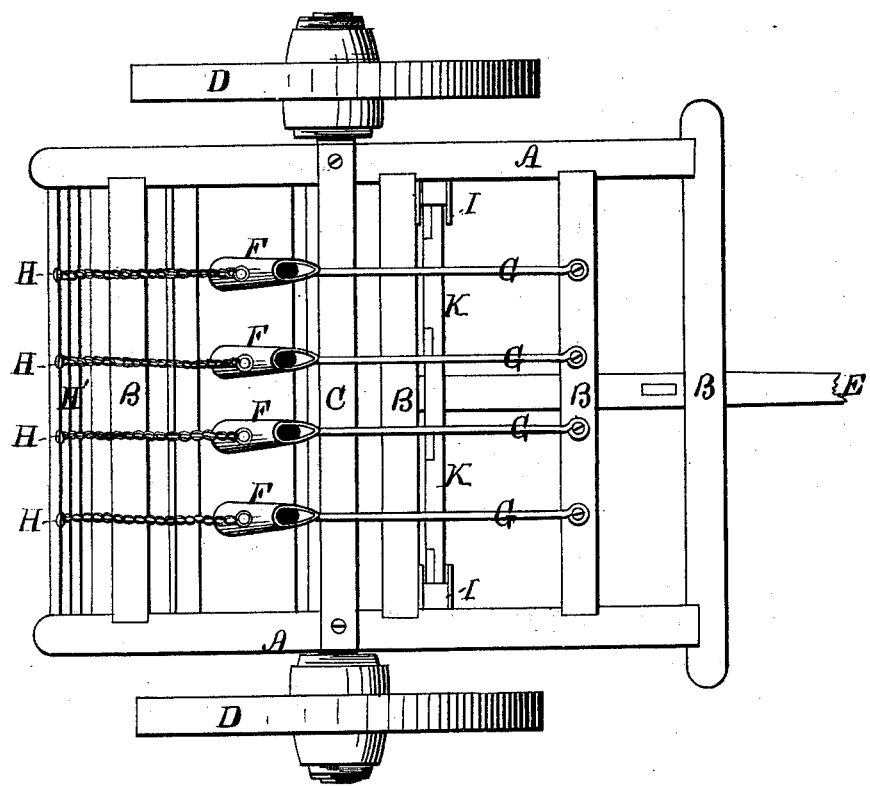

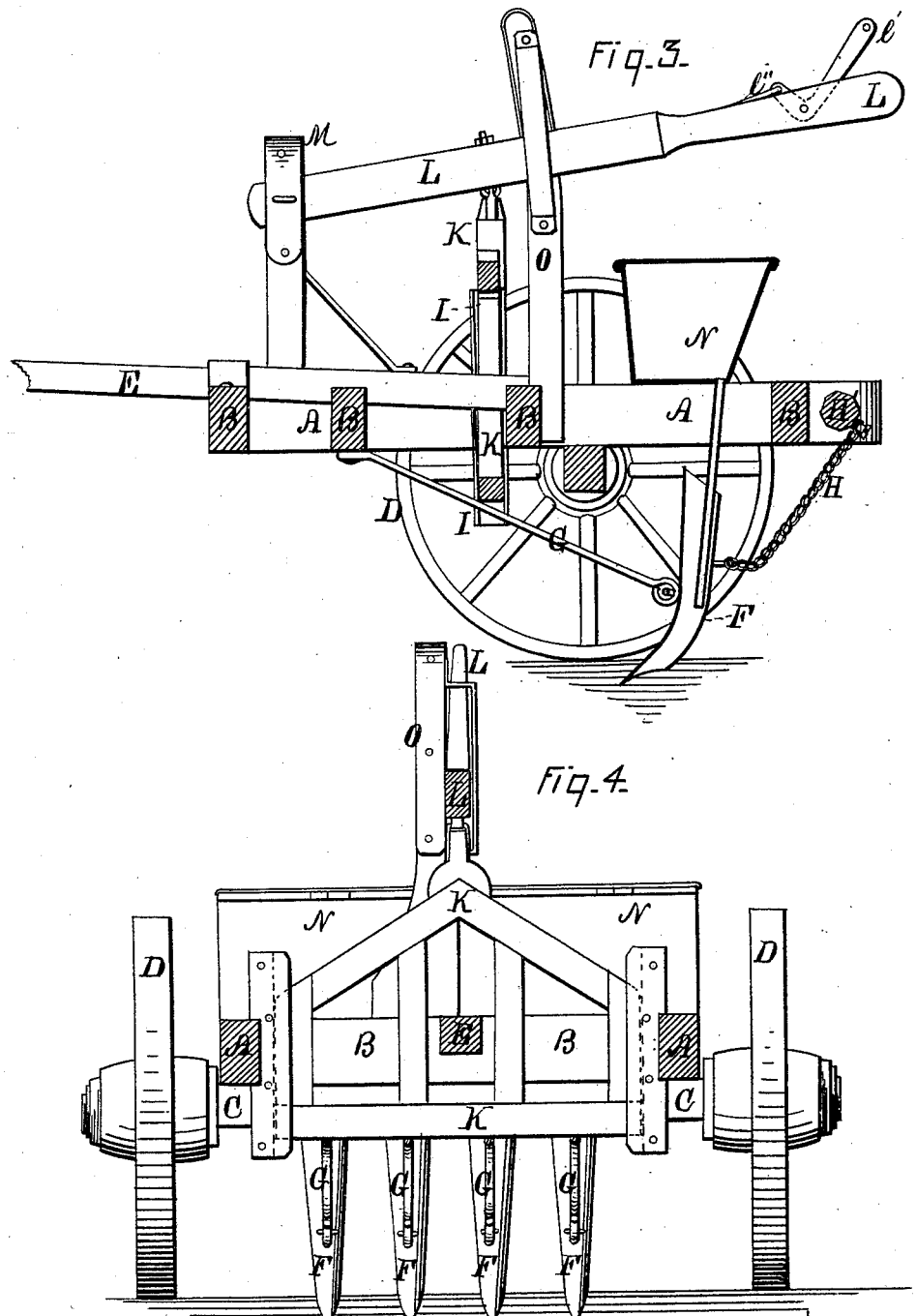

UNITED STATES PATENT OFFICE.

WILLIAM A. McCLINTOCK, OF PITTSFIELD, ILLINOIS.

IMPROVEMENT IN SEED-DRILLS.

Specification forming part of Letters Patent No. 165,603, dated July 13, 1875; application filed October 17, 1874.

*To all whom it may concern:*

Be it known that I, WILLIAM A. McCLINTOCK, of Pittsfield, in the county of Pike and in the State of Illinois, have invented certain new and useful Improvements in Seed-Drills; and do hereby declare that the following is a full, clear, and exact description thereof, reference being had to the accompanying drawings making a part of this specification, in which—

Figure 1 is a plan view of the upper side of my improved machine. Fig. 2 is a like view of the lower side of the same. Fig. 3 is a vertical section upon line $x\ x$ of Figs. 1 and 2, and Fig. 4 is a like view upon line $z\ z$ of same figures.

Letters of like name and kind refer to like parts in each of the figures.

The design of my invention is to increase the efficiency and ease of operation of seed-drills; to which end it consists in the employment of a frame or sash adjustable in guides, and operated by a lever for holding the drills down to a uniform depth within the ground, substantially as and for the purpose hereinafter specified.

In the annexed drawings, A and A represent the side rails, and B and B the cross-rails, that compose the frame of my machine, which frame rests upon an axle, C, that has journaled upon its ends two ground-wheels, D and D. A pole, E, is secured to the front end and transverse center of said frame, while a series of drills, F and F, are connected to or with one of the four cross-bars B by means of pivoted rods G and G. Suitable chains, H and H, are attached to the rear sides of the drills F and F, and from thence pass upward over a roller, H', and enable said drills to be raised or lowered, the machine thus constructed being of usual form.

In practice it is found impracticable to keep the drills down to a uniform depth in consequence of obstructions, hard spots in the soil, &c., and that, as a result, the grain is imperfectly covered in some places, while in others it may be planted too deeply in the ground. To obviate this difficulty I place within suitable vertical guides I and I, that are attached at corresponding points to or upon the inner sides of the side rails A and A, a sash or frame, K, the lower edge of which is horizontal and parallel with the axle, said frame being capable of easy vertical adjustment within said guides.

To the upper edge and transverse center of the frame K is pivoted a lever, L, one end of which is pivoted within a suitable post, M, that is secured to and extends upward from the pole E, while its opposite end projects rearward beyond the hopper N within convenient reach of the operator's hand.

By depressing the free end of the lever L the frame K will be moved downward and caused to bear upon the drill-rods G and G, the result being that said rods and their drills will be pressed downward to a uniform distance below the main frame, and prevented from rising, except as said gate is raised.

The gate or sash K is locked in position, either elevated or depressed, by means of a pawl, $l$, which engages with one of a series of teeth that are formed within a quadrant, O, which quadrant is attached to the main frame, and extends upward beside said lever. A suitable L-shaped hand-lever, $l'$, pivoted upon the free end of the lever L, and connected with the pawl $l$ by a wire, $l''$, enables the latter to be released from engagement at will.

While the construction shown, of the holding-down frame or gate, is preferably employed, it will be seen that the same may be varied in some respects without departure from the spirit of my invention.

I do not claim, broadly, a vertically-adjustable bar placed transversely over the drag-bars of a gang of hoes, to hold them down to a uniform depth within the ground, as this, broadly, is not new with me.

Having thus fully set forth the nature and merits of my invention, what I claim as new is—

The combination of the hoes F, drag-bars G, guides I I, sash K, and lever L, substantially as and for the purpose specified.

In testimony that I claim the foregoing I have hereunto set my hand this 14th day of October, 1874.

W. A. McCLINTOCK.

Witnesses:
  GEO. S. PRINDLE,
  WILLIAM FITCH.